(12) United States Patent
Wood et al.

(10) Patent No.: US 9,478,374 B2
(45) Date of Patent: Oct. 25, 2016

(54) PORTABLE LOAD-BREAKING AND PICKUP JUMPER APPARATUS

(71) Applicant: Utility Solutions, Inc., Hickory, NC (US)

(72) Inventors: Eugene H. Wood, Hickory, NC (US); Matthew G. Nolte, Hickory, NC (US)

(73) Assignee: Utility Solutions, Inc., Hickory, NC (US)

( * ) Notice: Subject to any disclaimer, the term of this patent is extended or adjusted under 35 U.S.C. 154(b) by 284 days.

(21) Appl. No.: 14/223,937

(22) Filed: Mar. 24, 2014

(65) Prior Publication Data

US 2014/0202836 A1 Jul. 24, 2014

Related U.S. Application Data

(63) Continuation-in-part of application No. 13/628,415, filed on Sep. 27, 2012, now Pat. No. 8,759,672.

(51) Int. Cl.
*H01H 31/00* (2006.01)
*H01H 33/16* (2006.01)
*H02G 1/02* (2006.01)

(52) U.S. Cl.
CPC ............. *H01H 31/00* (2013.01); *H01H 33/16* (2013.01); *H02G 1/02* (2013.01); *H01H 31/006* (2013.01)

(58) Field of Classification Search
USPC ...................... 174/40 R, 44, 45 R
See application file for complete search history.

(56) References Cited

U.S. PATENT DOCUMENTS

| 4,281,228 | A | * | 7/1981 | Harmon | ............... | H01H 33/121 |
| | | | | | | 200/308 |
| 6,078,008 | A | | 6/2000 | Wood et al. | | |
| 6,167,673 | B1 | | 1/2001 | Fournier | | |
| 6,446,408 | B1 | | 9/2002 | Gordin et al. | | |
| 6,626,406 | B1 | | 9/2003 | Olson, Jr. | | |
| 6,875,917 | B1 | | 4/2005 | Wood et al. | | |

* cited by examiner

*Primary Examiner* — Dhirubhai R Patel
(74) *Attorney, Agent, or Firm* — Trego, Hines & Ladenheim, PLLC

(57) ABSTRACT

A portable load-breaking and pickup apparatus for handling a load associated with a power distribution system is disclosed. The apparatus includes first and second spaced-apart connectors electrically connected by a load break assembly. The load break assembly includes first and second outer contacts configured for mating engagement and configured to provide a low-resistance path between the first and second connectors, and first and second inner contacts configured for mating engagement and configured to provide a high-resistance path between the first and second connectors. The load break assembly transitions from an open position to a closed position in two stages. The two stages include closing the high-resistance path prior to closing the low-resistance path, and closing the low-resistance path after the high-resistance path has been closed.

10 Claims, 10 Drawing Sheets

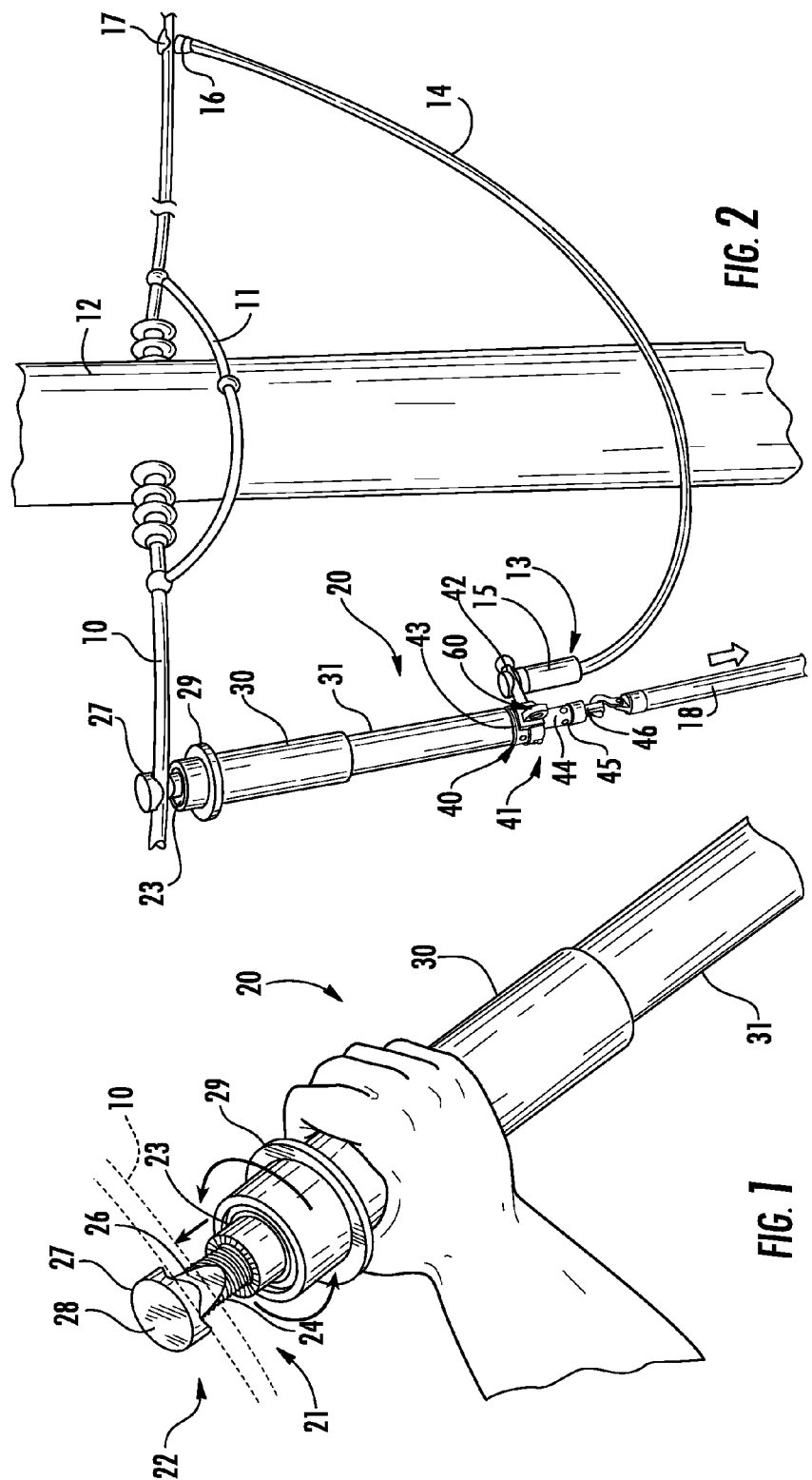

PORTABLE LOAD-BREAKING AND PICKUP JUMPER APPARATUS

BACKGROUND OF THE INVENTION

The present invention relates to the field of the power distribution servicing and maintenance industries and, more particularly, to an apparatus for handling a load associated with a power distribution system.

Over the years, power distribution systems have been developed which distribute power from various types of power generation facilities to end users such as residential and commercial customers. Today, power is still primarily distributed to residential and commercial customers using overhead-power-line networks. As used herein, an upstream direction along a power line will generally be in a direction toward a power generation facility or power source, and a downstream direction along a power line will generally be in a direction toward a customer, e.g., residential or commercial, or other user of power.

These overhead-power-line networks require regular maintenance and repair to ensure proper operation, thereby ensuring that customers receive reliable and continuous power. Unfortunately, maintenance and repair work on overhead power lines can be quite dangerous. For example, cutting live power cables can result in dangerous electric arcing.

Conventionally, an upstream switch must be opened before cutting any downstream portion of an overhead power line so that repairs or maintenance can be performed. However, opening an upstream switch associated with the power line cuts power to all customers downstream of the switch. An alternative approach is to provide a device that can break and return load to an overhead power line without the need to open the upstream switch. An exemplary load-breaking and load-returning apparatus is disclosed in commonly assigned U.S. Pat. No. 6,078,008, which is hereby incorporated by reference in its entirety.

That being said, present day devices do not control arcing in a manner suitable for high amperage situations. The current devices work well for low amperage operations where controlling arc is of less importance; however, as utilities deal with higher amperages, a device that provides greater control of dangerous arcing is needed.

BRIEF SUMMARY OF THE INVENTION

These and other shortcomings of the prior art are addressed by the present invention, which provides a portable load-breaking and pickup jumper apparatus configured for controlled closing to mitigate dangerous arcing.

According to one aspect of the present invention, a portable load-breaking and pickup apparatus includes first and second spaced-apart connectors electrically connected by a load break assembly. The load break assembly includes first and second outer contacts configured for mating engagement and configured to provide a low-resistance path between the first and second connectors, and first and second inner contacts configured for mating engagement and configured to provide a high-resistance path between the first and second connectors. The load break assembly transitions from an open position to a closed position in two stages. The two stages include closing the high-resistance path prior to closing the low-resistance path, and closing the low-resistance path after the high-resistance path has been closed.

According to another aspect of the present invention, a portable load-breaking and pickup jumper apparatus includes a first connector configured for direct connection to a power line and a second connector electrically connected to the first connector. The second connector is electrically connected to the power line by a jumper cable. The apparatus further including a load break assembly electrically connected between the first connector and the second connector. The load break assembly includes first and second outer contacts configured for mating engagement and configured to provide a low-resistance path between the first and second connectors, and first and second inner contacts configured for mating engagement and configured to provide a high-resistance path between the first and second connectors. When the apparatus transitions from a closed position to an open position, the first and second outer contacts separate to break the low-resistance path while the first and second inner contacts remain engaged. The first and second inner contacts separate to break the high-resistance path once a pre-determined gap between the first and second outer contacts is achieved. When the apparatus transitions from the open position to the closed position, the first and second inner contacts re-engage prior to the first and second outer contacts to reestablish the high-resistance path and contain arcing within an insulator. The first and second outer contacts then re-engage to reestablish the low-resistance path.

According to another aspect of the present invention, a portable load-breaking and pickup jumper apparatus includes a first connector configured for direct connection to a power line; a second connector configured for connection to a power line by a jumper cable, wherein when the apparatus is in a closed position, the second connector is electrically connected to the first connector to allow a flow of electricity through the apparatus; and a load breaking assembly electrically connected between the first and second connectors. The load breaking assembly includes a venting structure configured for axial movement and electrically connected to the second connector; an outer male contact connected to an end of the venting structure; an inner housing electrically connected to the first connector; an outer female contact connected to an end of the inner housing and configured for mating engagement with the outer male contact to provide a low-resistance path; an insulating sleeve positioned inside of the inner housing; a probe assembly electrically connected to the first connector and positioned in the insulating sleeve, the probe assembly including a contact portion and an insulating portion; and an inner female contact secured in electrical contact with the outer male contact by the insulating sleeve. The inner female contact includes a plurality of fingers extending into the insulating sleeve for engagement with the contact portion when in the closed position to provide a high-resistance path. When the apparatus is transitioned from the closed position to an open position, the venting structure is pulled outwardly from the apparatus. The outer male contact separates from the outer female contact to break the low-resistance path. The inner female contact and the contact portion remain engaged until a pre-determined gap between the outer male and female contacts is achieved and then separate to break the high-resistance path. When the apparatus is transitioned from the open position to the closed position, the venting structure is released to allow the venting structure to move inwardly towards the apparatus. The inner female contact and contact portion engage to reestablish the high-resistance path prior to engagement between the outer male and female contacts, thereby containing arcing in the insulating sleeve.

BRIEF DESCRIPTION OF THE DRAWINGS

The subject matter that is regarded as the invention may be best understood by reference to the following description taken in conjunction with the accompanying drawing figures in which:

FIG. 1 is a fragmentary perspective view of a portable load-breaking and pickup jumper apparatus in accordance with an embodiment of the invention;

FIG. 2 is a perspective view of the apparatus of FIG. 1 positioned on a power line;

DETAILED DESCRIPTION OF THE INVENTION

Figure 3:
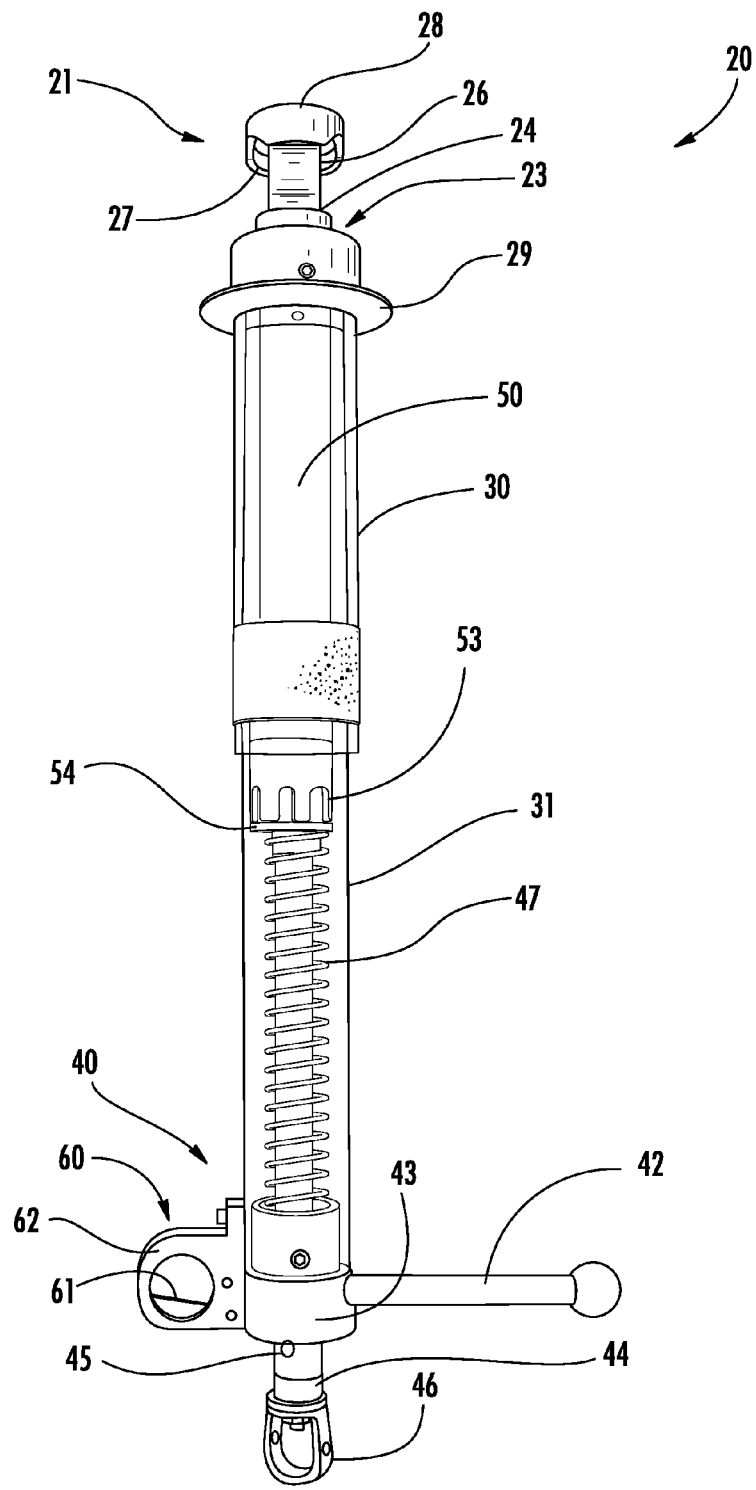
FIG. 3 is a plan view of the apparatus of FIG. 1.
Figure 4:
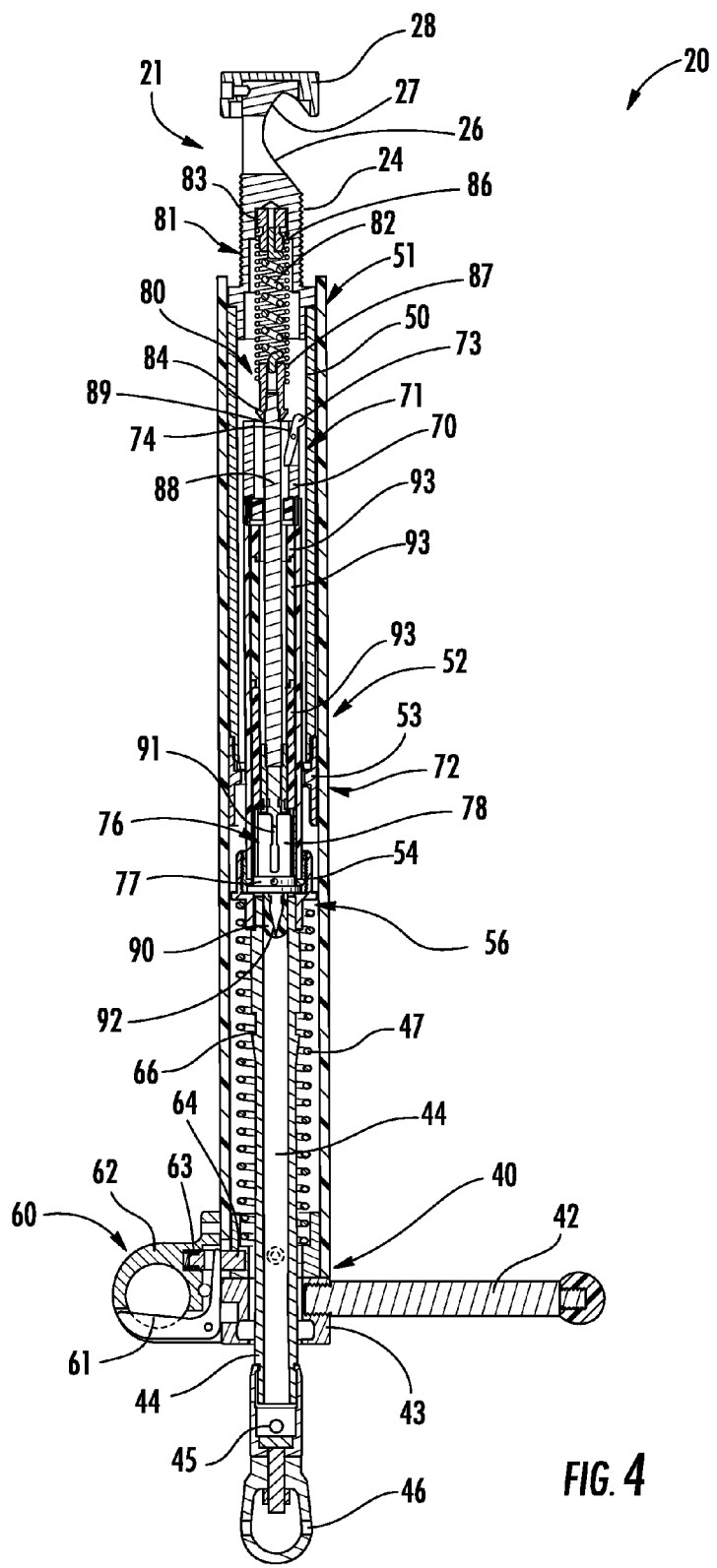
FIG. 4 is a cross-sectional view of the apparatus of FIG. 3.
Figure 5:
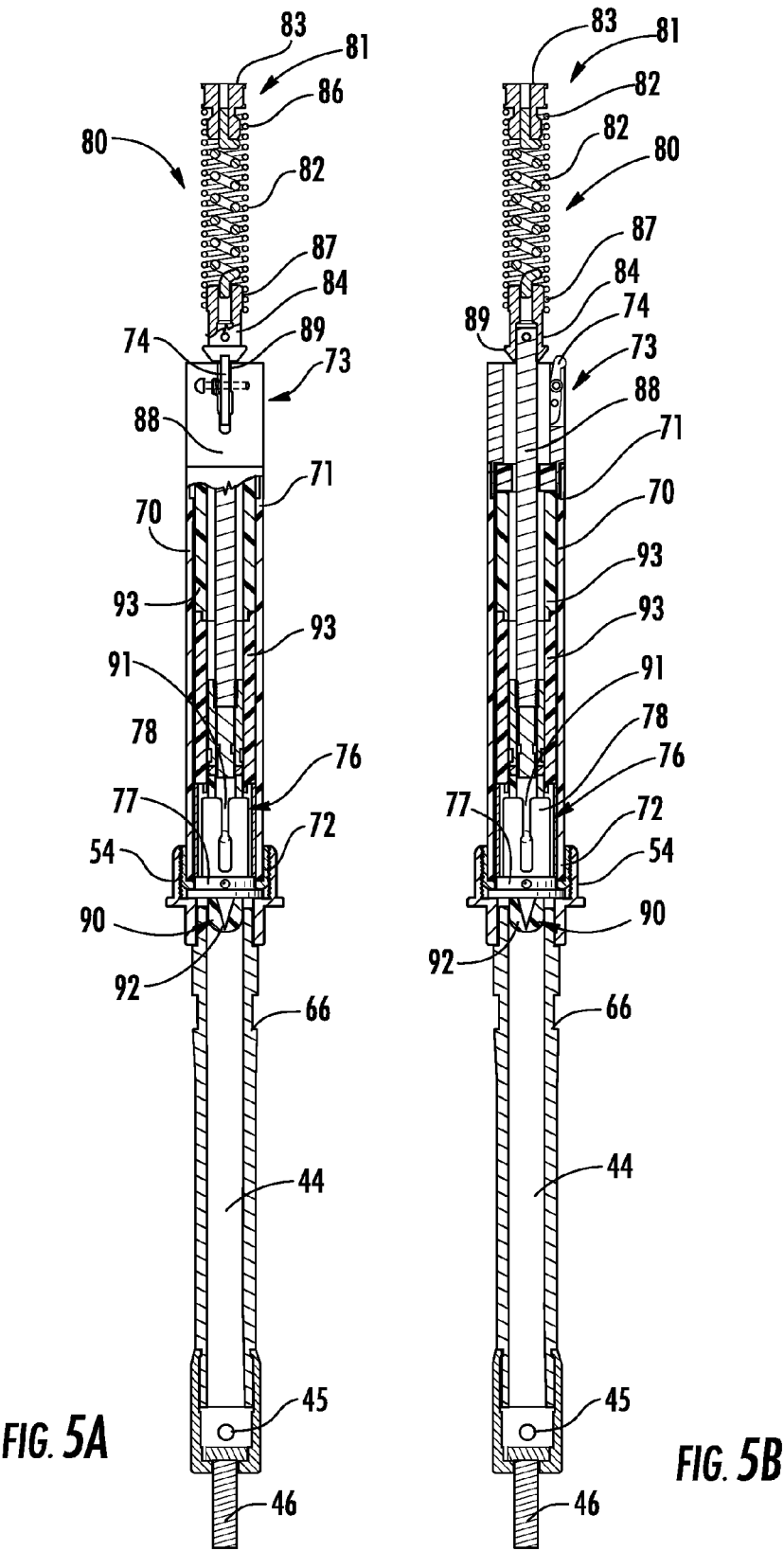
FIGS. 5A and 5B are cross-sectional views of internal parts of the apparatus of FIG. 3.
Figure 6:
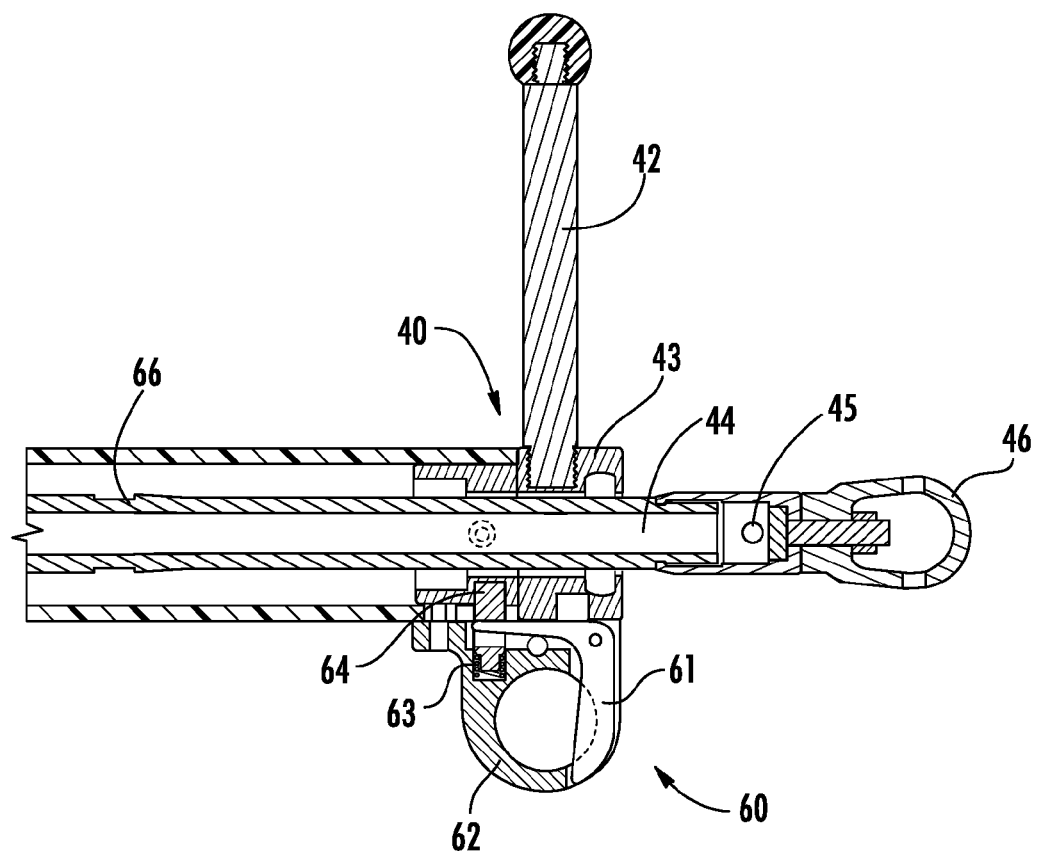
FIG. 6 is a cross-sectional view of a trigger assembly of the apparatus of FIG. 3.
Figure 7:
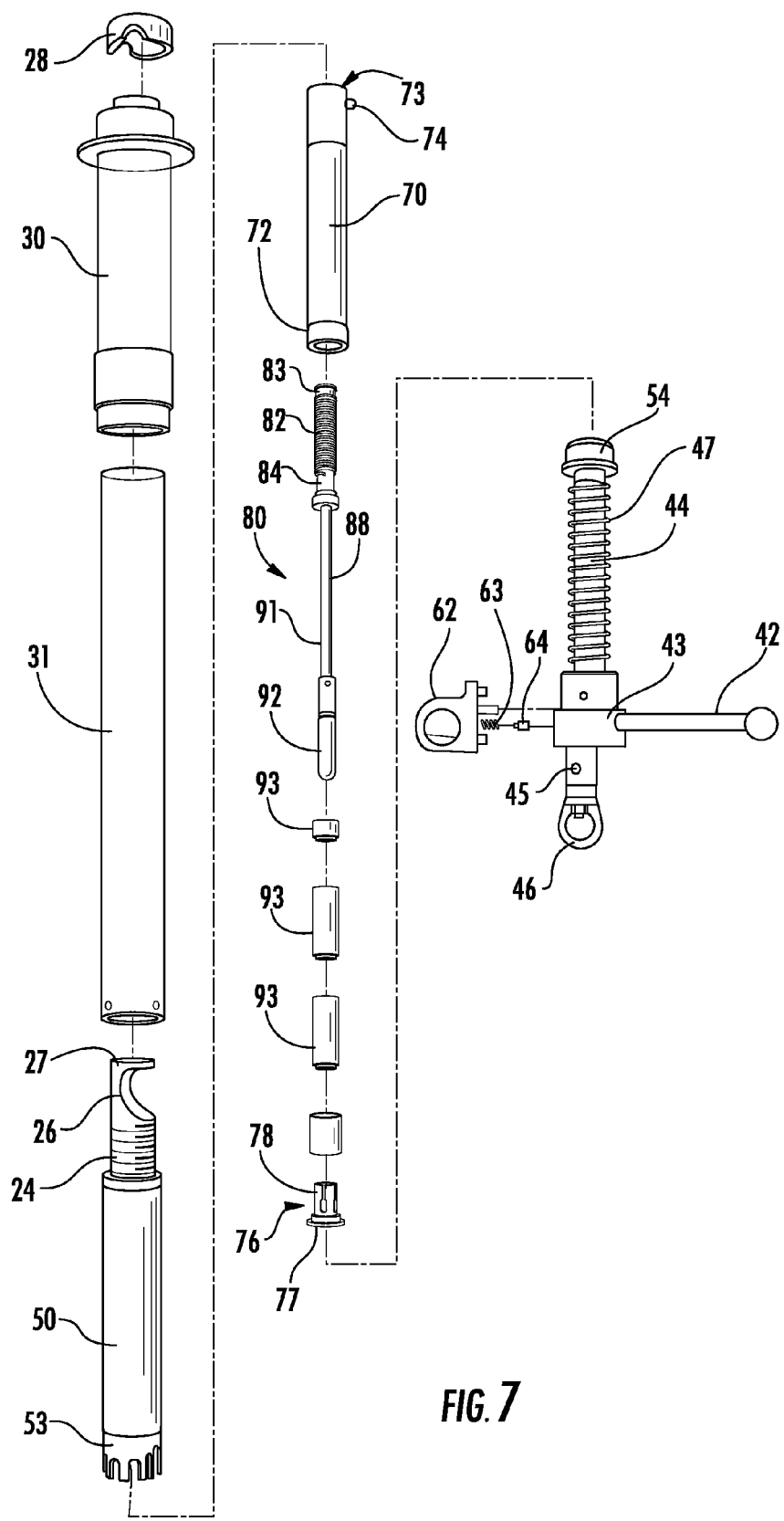
FIG. 7 is an exploded view of the internal parts of the apparatus of FIG. 3.

Referring to the drawings, an exemplary portable load breaking and pickup jumper apparatus according to the present invention is illustrated in FIGS. 1-3 and shown generally at reference numeral 20. The apparatus 20 is designed to be placed onto a power line 10 to quickly break and return a load to portions of the line 10.

The apparatus 20 typically includes a first connector 21 positioned at a first end 22 of the apparatus 20 for direct connection to the power line 10 and a second connector 40 positioned on a second end 41 of the apparatus 20 to allow a jumper cable 14 to be connected between the connector 40 and the power line 10.

The first connector 21 and second connector 40 are formed from one or more conductive materials. The first connector 21 includes a clamp head 23, a threaded clamp body 24 having a clamping surface 26 (i.e., cut away or grooved portion) and a hook portion 27, and a top cap 28 connected to the threaded clamp body 24. The clamp head 23 includes an upper hand guard 29 and an upper outer housing 30 which can be manually gripped by a hand of a user to thereby threadingly adjust the first connector 21 between open or closed positions. As understood by those skilled in the art, other types of power line connectors can be used for the first and second connectors according to the present invention. For example, a clamp applied with a gripping style hotstick or utility tool known as a "shotgun stick" by those skilled in the art, can be used as well.

A lower outer housing 31 extends between the first connector 21 and the second connector 40; thereby extending a portion of the lower outer housing 31 into an interior of the upper outer housing 30. The upper and lower outer housings 30 and 31 are typically formed from one or more insulating materials, such as fiberglass.

The second connector 40 includes a collar 43 connected to a lower end of the lower outer housing 31 and a conductor bar 42 connected to the collar. A reset trigger assembly 60 is also connected to the collar 43. The reset trigger assembly 60 may be triggered using a hotstick 18 or other suitable device. As shown, a first end 13 of the jumper cable 14 is connected to the conductor bar 42 using a first clamp 15 and a second end 16 of the jumper cable 14 is connected to the power line 10 using a second clamp 17.

A venting structure 44 having vents 45 is contained in the lower outer housing 31 and extends through a bore of the second connector 40. The venting structure 44 is slidable axially along the apparatus 20 to transition the apparatus 20 between a closed position and an open position. An engaging ring 46 is connected to a first end 48 of the venting structure 44 to allow a hotstick 18 or other suitable device to engage the ring 46 and allow a user to pull the venting structure 44 outwardly from the lower outer housing 31, thereby transitioning the apparatus 20 from the closed position to the open position. A spring 47 biases the venting structure 44 towards a closed position. As the apparatus 20 transitions from the closed position to the open position, the spring 47 is compressed. The compression of the spring 47 provides a force that enables the apparatus 20 to automatically return to the closed position.

Referring to FIGS. 4-7, the apparatus 20 includes an inner housing 50. A first end 51 of the inner housing 50 is connected to the threaded clamp body 24 and a second end 52 of the inner housing 50 is connected to an outer female contact 53. A mating outer male contact 54 is connected to a second end 56 of the venting structure 44. As illustrated, the spring 47 surrounds the venting structure 44 and is held in position between the male contact 54 and the second connector 40. The outer female and male contacts 53 and 54 are formed of a conductive material, such as brass.

An insulated sleeve 70 resides inside of inner housing 50 and includes first and second ends 71 and 72, respectively. The second end 72 of the sleeve 70 is connected by threaded engagement to the outer male contact 54. A toggle assembly 73 having a toggle 74 is connected to the first end 71. An inner female contact 76 is secured between the second end 72 and the outer male contact 54 by compression. The inner female contact 76 includes a flange 77 for being compressed by the second end 72 and the outer male contact 54 and a plurality of fingers 78 extending outwardly from the flange 77 into an interior of the insulating sleeve 70.

The insulating sleeve 70 is configured to receive a probe assembly 80 therein. Probe assembly 80 includes a first end 81 having a load break spring 82, a spring connector 83, and a ramped rod connector 84. As shown, spring connector 83 is connected to a first end 86 of the spring 82 and rod connector 84 is connected to a second end 87 of the spring 82. The spring connector 83 secures the probe assembly 80 to an inside surface of the threaded clamp body 24.

A rod 88 having first and second ends 89 and 90, respectively, is connected to the rod connector 84 by first end 89 such that the rod 88 extends outwardly from the first end 81 and into the insulated sleeve 70. The second end 90 of the rod 88 includes a contact portion 91 for engaging inner female contact 76 and an insulated portion 92 for disengaging the contact portion 91 from the inner female contact 76. Insulating arc tubes 93 are positioned over the rod to control arc. The contact portion 91 and the inner female contact 76 are formed of a conductive material, such as brass.

Trigger assembly 60 is connected to the collar 43 and includes a lever 61, a trigger guard 62, a trigger spring 63, and a trigger plug 64. In a non-use position, the lever 61 compresses the spring 63 against the plug 64 which is compressed against the venting structure 44. When the venting structure 44 is pulled outwardly to transition the apparatus 20 from a closed position to an open position, the plug is pushed into a locking groove 66 to secure the apparatus 20 in the open position. When the lever 61 is depressed, the spring 63 is decompressed, thereby allowing the plug to disengage the locking groove 66 which in turn allows the apparatus 20 to transition from the open position to the closed position. Lockout provisions may also be incorporated with the trigger assembly 60. This provisions include inserting a lockout bolt to prevent the trigger from being depressed or to prevent the venting structure 44 from moving, placing a cover over the trigger assembly 60 which prevents a user from accessing the assembly 60, or any other suitable provision.

Referring now to FIGS. 8-11, in general, to facilitate the transition between the closed position and the open position, the apparatus 20 typically includes a low-resistance current path and a high-resistance current path. In the closed position, both the low-resistance current path and the high-resistance current path are typically closed, whereas, in the open position, both paths are open. During the transition from the closed position to the open position, the low-resistance current path will typically open before the high-resistance current path.

Figure 8:
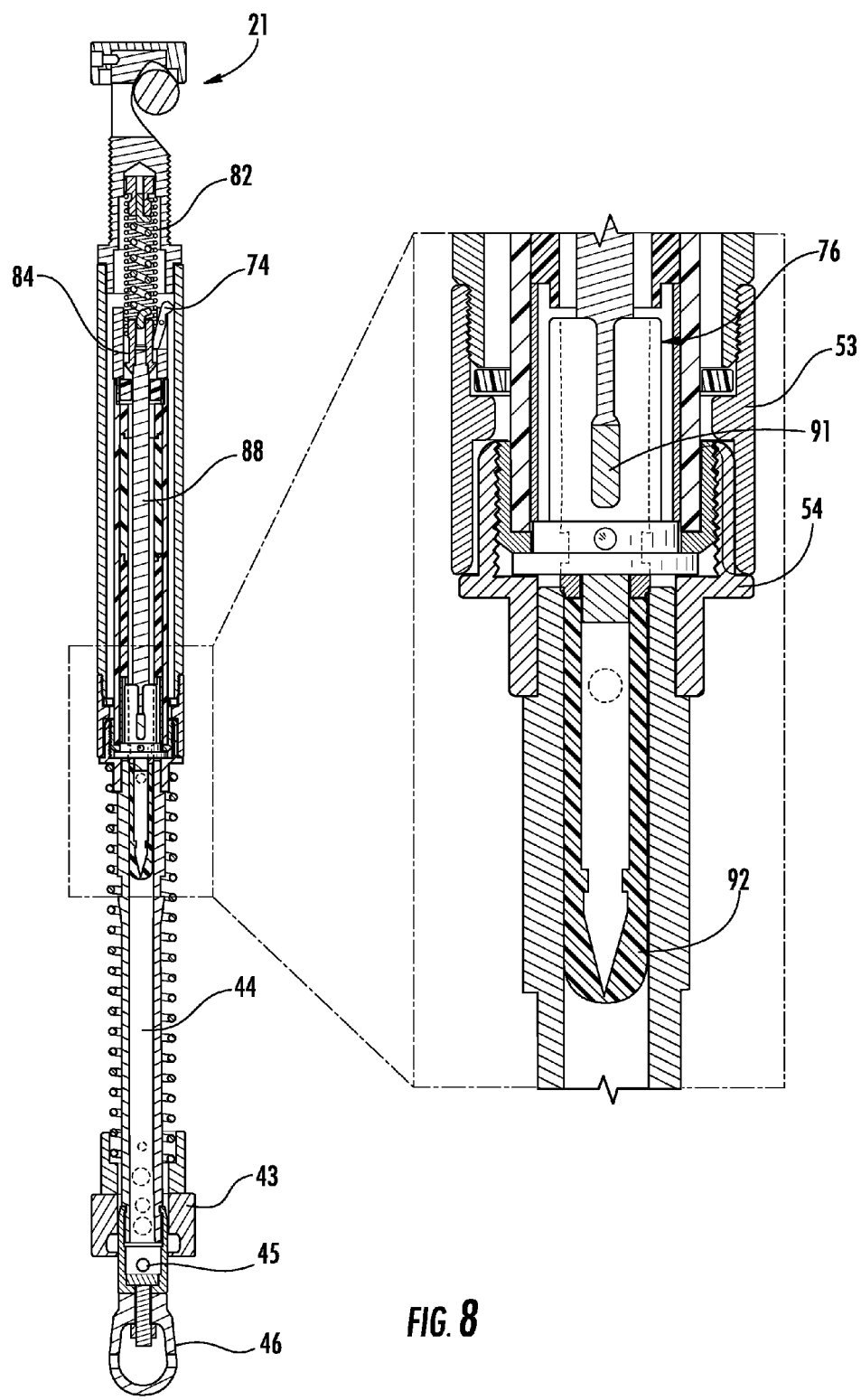
FIGS. 8-11 are cross-sectional views of the apparatus of FIG. 3 showing interaction of the internal parts as the apparatus moves from the closed position to the open position and back to the closed position.

In the closed position, FIG. 8, the apparatus 20 provides a low-resistance current path from the first connector 21 to the second connector 40. As shown, the outer male contact 54 is in mating engagement with the outer female contact 53 and the inner female contact 76 is in mating engagement with contact portion 91. Additionally, toggle 74 is in mating engagement with rod connector 84. In order to transition the apparatus 20 to an open position, a user uses hotstick 18 to pull the venting structure 44 outwardly from the lower outer housing 31.

Figure 9:
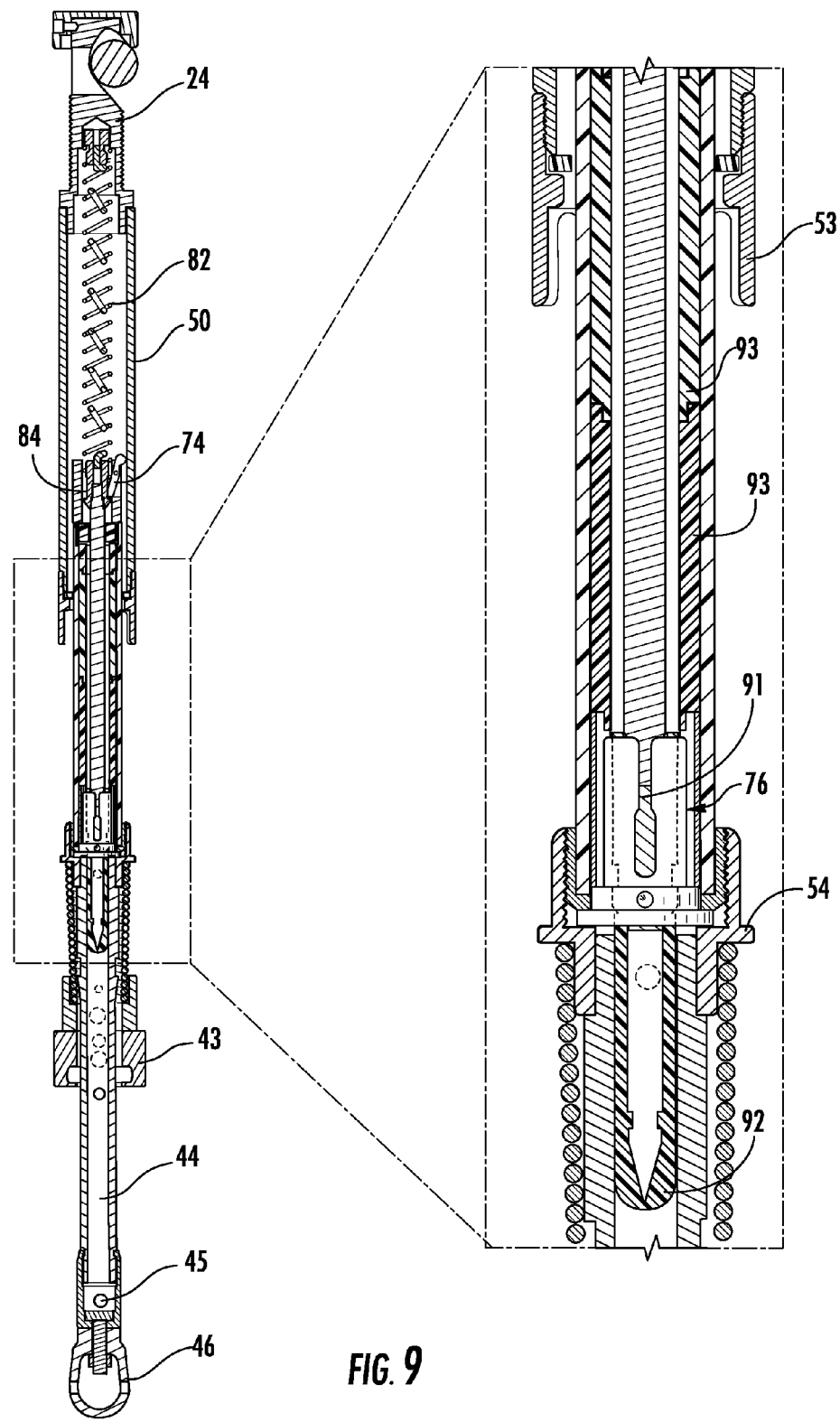

As the apparatus 20 transitions from the closed position to the open position, FIG. 9, the low-resistance path is broken by separation of the outer male contact 54 from the outer female contact 53. Additionally, the load break spring 82 is expanded due to the toggle 74 being engaged with the rod connector 84. The inner female contact 76 and contact portion 91 are still in mating engagement to maintain the high-resistance path.

Figure 10:
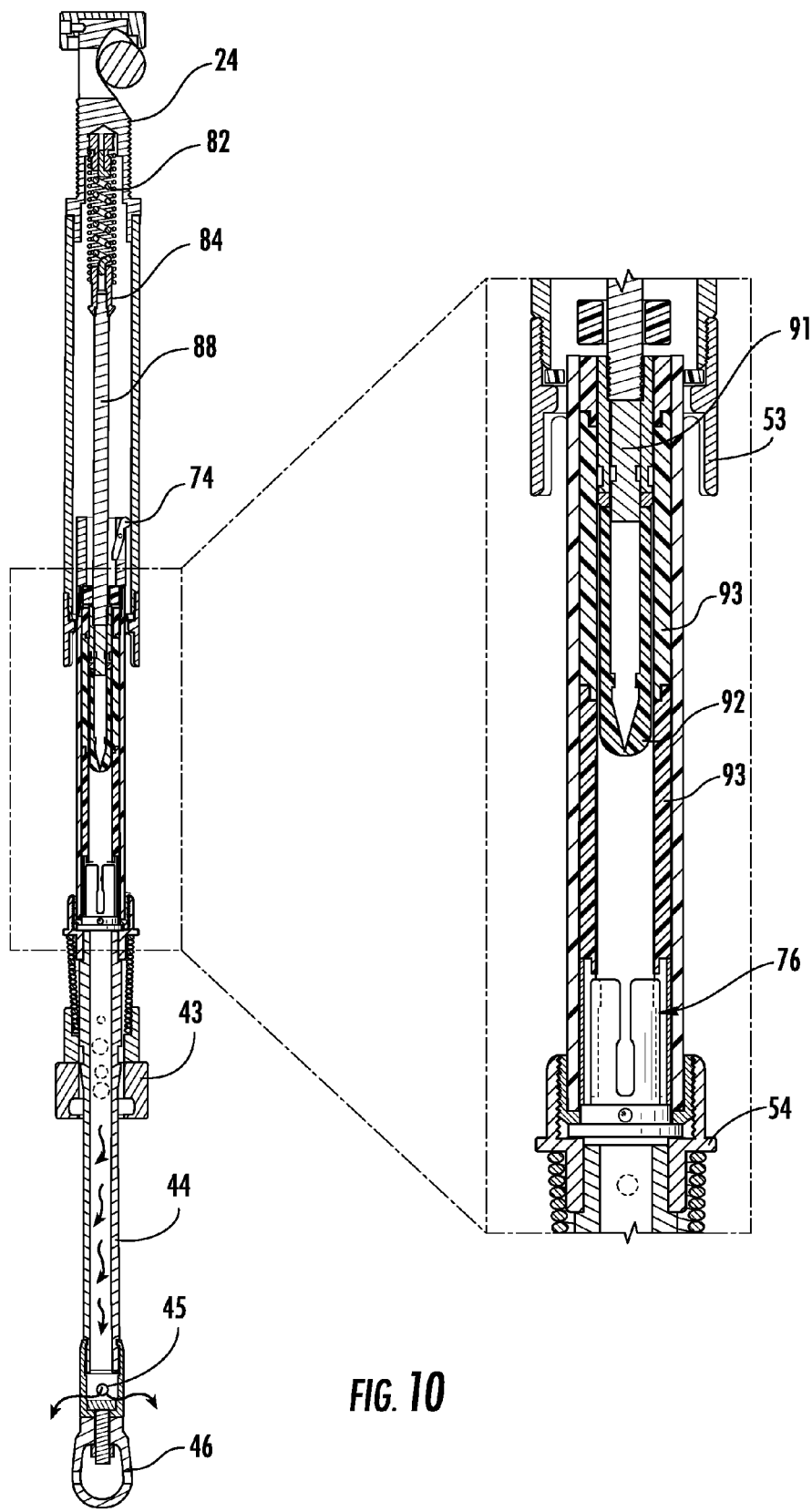
Figure 11:
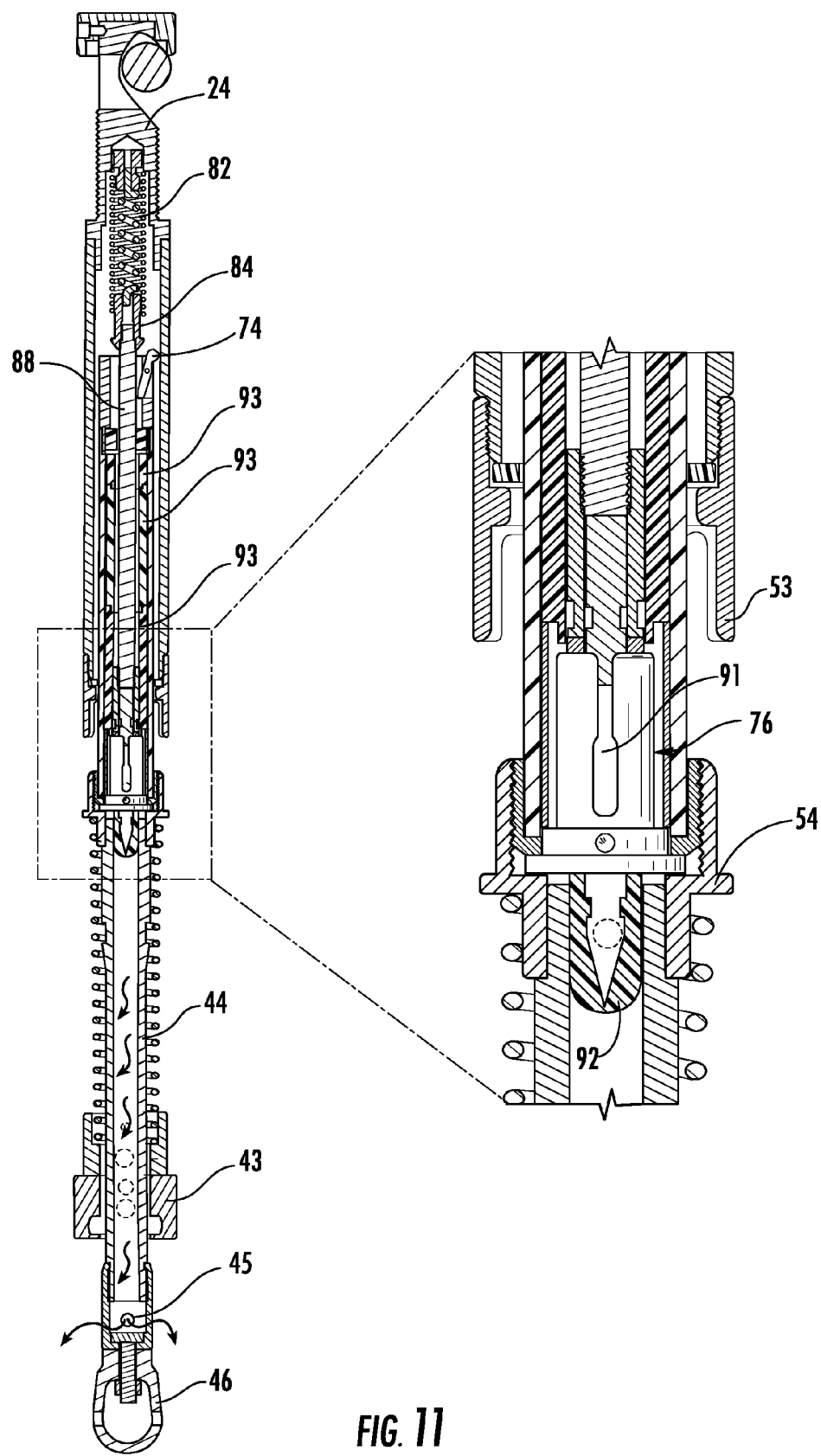

Once sufficient gap is achieved between the outer male contact 54 and the outer female contact 53 to withstand the voltage after the load break operation, the toggle 74 toggles from an engagement position to a non-engagement position by an interior surface of the first inner housing 50; thereby, disengaging the toggle 74 from the rod connector 84 and releasing the load break spring 82 to move from an expanded position to a normal position, FIG. 10. This in turn causes the probe assembly 80 to move upwardly towards the threaded clamp body 24; thereby disengaging the inner female contact 76 from the contact portion 91. This disengagement occurs rapidly as the load break spring 82 retracts and allows the disengagement to occur within the insulating arc tubes 93; thereby breaking the high-resistance path and the electrical arc quickly and safely. The venting structure 44 is continued to be pulled outwardly from the lower outer housing 31 until the trigger plug 64 engages the locking groove 66 to maintain the apparatus 20 1in the open position. Venting of hot gasses from the transition between closed and open positions, escape down the venting structure 44 and out vents 45.

In order to transition the apparatus 20 from the open position to the closed position, a user depresses lever 61 using the hotstick 18 or other suitable tool. Once the lever 61 has been depressed, the trigger plug 64 is allowed to disengage the locking groove 66; thereby allowing the venting structure 44 to move inwardly towards the lower outer housing 31. As discussed above, the spring 47 is compressed during the transition from the closed position to the open position and, as a result, the spring 47 forces the venting structure 44 inwardly as it expands to a non-compressed position.

Generally, it is known in the industry that when two contacts are closing into one another and an AC voltage exists between the two, there will always be an arc before the contacts actually touch. As the gap between the contacts narrows, the sine wave feature of AC voltage continually changes the voltage difference between the contacts. The arc always seems to form at the point when the AC wave is at its peak. This being the case, picking up electrical load can cause damaging arcing, particularly when dealing with high amperage situations.

As the venting structure 44 moves inwardly, a two stage closing occurs to pick-up the electrical load and minimize damaging arcing. First, the inner female connector 76 comes into contact with the contact portion 91. This allows the temporary path or high-resistance path to close first inside the insulating arcing tubes. As the inner female connector 76 comes into contact with the contact portion 91, the fingers 78 make initial contact with the contact portion 91 and then slide over the contact portion 91 for a pre-determined distance to provide overlapping. As the fingers 78 slide over the contact portion 91 in an overlapping manner, the outer male contact 54 and outer female contact 53 engage to close the low-resistance path. Because of the two stage closing, the damaging arcing is contained.

As the inner and outer contacts close, hot gases are vented out of the apparatus 20 through the venting structure 44 and out the vents 45.

The foregoing has described a portable load-breaking and pick up jumper apparatus. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

We claim:

1. A portable load-breaking and pickup apparatus, comprising:
   (a) first and second spaced-apart connectors electrically connected by a load break assembly, the load break assembly including:
      (i) first and second outer contacts configured for mating engagement and configured to provide a low-resistance path between the first and second connectors;
      (ii) an inner contact and contact portion configured for mating engagement and configured to provide a high-resistance path between the first and second connectors;
      (iii) a venting structure configured to permit hot gases created by arcing to escape the apparatus when the load break assembly transitions from an open position to a closed position;
   (b) wherein the load break assembly transitions from the open position to the closed position in two stages, the two stages include:
      (i) closing the high-resistance path prior to closing the low-resistance path; and (ii) closing the low-resistance path after the high-resistance path has been closed.

2. A portable load-breaking and pickup jumper apparatus, comprising:
(a) a first connector configured for direct connection to a power line and a second connector electrically connected to the first connector, the second connector being electrically connected to the power line by a jumper cable;
(b) a load break assembly electrically connected between the first connector and the second connector, the load break assembly including:
(i) first and second outer contacts configured for mating engagement and configured to provide a low-resistance path between the first and second connectors;
(ii) an inner contact and a contact portion configured for mating engagement and configured to provide a high-resistance path between the first and second connectors;
(c) wherein when the apparatus transitions from a closed position to an open position, the first and second outer contacts separate to break the low-resistance path while the inner contact and contact portion remain engaged, the inner contact and contact portion separate to break the high-resistance path once a pre-determined gap between the first and second outer contacts is achieved;
(d) wherein when the apparatus transitions from the open position to the closed position, the inner contact and contact portion re-engage prior to the first and second outer contacts to reestablish the high-resistance path and contain arcing within an insulator, the first and second outer contacts then re-engage to reestablish the low-resistance path; and
(e) wherein the apparatus vents hot gases created by arcing when transitioning from the closed position to the open position and when transitioning from the open position to the closed position.

3. The apparatus according to claim 2, wherein the inner contact and contact portion slidably engage.

4. The apparatus according to claim 3, wherein the contact portion has a length sufficient to provide an overlap between the inner contact and the contact portion, thereby creating a timed separation.

5. A portable load-breaking and pickup jumper apparatus, comprising:
(a) a first connector configured for direct connection to a power line;
(b) a second connector configured for connection to a power line by a jumper cable, wherein when the apparatus is in a closed position, the second connector is electrically connected to the first connector to allow a flow of electricity through the apparatus;
(c) a load breaking assembly electrically connected between the first and second connectors, the load breaking assembly including:
(i) a venting structure configured for axial movement and electrically connected to the second connector;
(ii) an outer male contact connected to an end of the venting structure;
(iii) an inner housing electrically connected to the first connector;
(iv) an outer female contact connected to an end of the inner housing and configured for mating engagement with the outer male contact to provide a low-resistance path;
(v) an insulating sleeve positioned inside of the inner housing;
(vi) a probe assembly electrically connected to the first connector and positioned in the insulating sleeve, the probe assembly including a contact portion and an insulating portion;
(vii) an inner female contact secured in electrical contact with the outer male contact by the insulating sleeve, the inner female contact including a plurality of fingers extending into the insulating sleeve for engagement with the contact portion when in the closed position to provide a high-resistance path;
(e) wherein when the apparatus is transitioned from the closed position to an open position, the venting structure is pulled outwardly from the apparatus, the outer male contact separates from the outer female contact to break the low-resistance path, the inner female contact and the contact portion remain engaged until a pre-determined gap between the outer male and female contacts is achieved and then separate to break the high-resistance path; and
(f) wherein when the apparatus is transitioned from the open position to the closed position, the venting structure is released to allow the venting structure to move inwardly towards the apparatus, the inner female contact and contact portion engage to reestablish the high-resistance path prior to engagement between the outer male and female contacts, thereby containing arcing in the insulating sleeve.

6. The apparatus according to claim 5, further including an insulating outer housing positioned between the first and second connectors and configured to the load breaking assembly.

7. The apparatus according to claim 5, wherein the venting structure is configured to permit hot gases caused by arcing to escape the apparatus during the transition from the closed position to the open position.

8. The apparatus according to claim 5, wherein the venting structure is configured to permit hot gases caused by arcing to escape the apparatus during the transition from the open position to the closed position.

9. The apparatus according to claim 5, wherein the probe assembly includes a load break spring configured to stretch as the apparatus is transitioning from the closed position to the open position, the load break spring is stretched to a pre-determined length and then snaps back to an un-stretched position causing disengagement of the contact portion from the inner female contact.

10. The apparatus according to claim 9, wherein a toggle assembly engages the probe assembly to stretch the load break spring and disengages the probe assembly to permit the load break spring to snap back to an un-stretched position.

* * * * *